(12) United States Patent
Vu et al.

(10) Patent No.: US 10,968,746 B2
(45) Date of Patent: Apr. 6, 2021

(54) SERPENTINE TURN COVER FOR GAS TURBINE STATOR VANE ASSEMBLY

(71) Applicant: United Technologies Corporation, Farmington, CT (US)

(72) Inventors: Ky H. Vu, East Hartford, CT (US); Dominic J. Mongillo, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 193 days.

(21) Appl. No.: 16/159,149

(22) Filed: Oct. 12, 2018

(65) Prior Publication Data

US 2020/0088038 A1    Mar. 19, 2020

Related U.S. Application Data

(60) Provisional application No. 62/731,395, filed on Sep. 14, 2018.

(51) Int. Cl.
*F01D 5/18* (2006.01)
*F01D 5/08* (2006.01)
*F01D 5/14* (2006.01)

(52) U.S. Cl.
CPC ............ *F01D 5/087* (2013.01); *F01D 5/147* (2013.01); *F01D 5/187* (2013.01); *F05D 2230/237* (2013.01); *F05D 2240/81* (2013.01); *F05D 2250/185* (2013.01); *F05D 2260/201* (2013.01)

(58) Field of Classification Search
CPC ...... F01D 5/187; F01D 9/065; F05D 2240/81; F05D 2240/80
See application file for complete search history.

(56) References Cited

U.S. PATENT DOCUMENTS

| 7,108,479 | B2* | 9/2006 | Beverley | F01D 5/187 |
| | | | | 415/115 |
| 7,445,432 | B2* | 11/2008 | Levine | F01D 5/187 |
| | | | | 416/96 R |
| 8,821,111 | B2* | 9/2014 | Gear | F01D 5/187 |
| | | | | 415/115 |

(Continued)

FOREIGN PATENT DOCUMENTS

| EP | 3348787 | 7/2018 |
| WO | 2014165518 A1 | 10/2014 |

OTHER PUBLICATIONS

European Search Report for Application No. 19 18 4771.

*Primary Examiner* — Eldon T Brockman
(74) *Attorney, Agent, or Firm* — Cantor Colburn LLP

(57) ABSTRACT

A stator vane assembly including an inner diameter platform. The assembly also includes an outer diameter platform defining an air inlet orifice extending radially therethrough. Further included is an airfoil extending between the inner diameter platform and the outer diameter platform, the airfoil having a hollow portion therein defining a serpentine cooling airflow path fluidly coupled to the air inlet orifice. Yet further included is a collar extending radially outwardly from the outer diameter platform and positioned adjacent the air inlet orifice, the collar extending to a non-uniform radial distance. The assembly also includes a turn cover operatively coupled to the collar.

20 Claims, 5 Drawing Sheets

(56) References Cited

U.S. PATENT DOCUMENTS

| | | | |
|---|---|---|---|
| 8,870,524 B1 * | 10/2014 | Liang | F01D 9/065 |
| | | | 415/115 |
| 9,845,694 B2 | 12/2017 | Hagan et al. | |
| 10,344,606 B2 * | 7/2019 | Farah | F01D 9/042 |
| 10,465,528 B2 * | 11/2019 | Spangler | F01D 9/065 |
| 2004/0258516 A1 * | 12/2004 | Beverley | F01D 5/187 |
| | | | 415/115 |
| 2007/0231138 A1 * | 10/2007 | Levine | F01D 5/187 |
| | | | 416/97 R |
| 2012/0148383 A1 * | 6/2012 | Gear | F01D 5/187 |
| | | | 415/115 |
| 2016/0053622 A1 * | 2/2016 | Farah | F01D 25/005 |
| | | | 415/200 |
| 2018/0195397 A1 * | 7/2018 | Spangler | F01D 9/041 |
| 2018/0223676 A1 * | 8/2018 | Spangler | F01D 9/065 |

* cited by examiner

SERPENTINE TURN COVER FOR GAS TURBINE STATOR VANE ASSEMBLY

CROSS-REFERENCE TO RELATED APPLICATIONS

This application claims the benefit of U.S. Provisional Application No. 62/731,395 filed Sep. 14, 2018, which is incorporated herein by reference in its entirety.

STATEMENT OF FEDERAL SUPPORT

This invention was made with Government support awarded by the United States. The Government has certain rights in the invention.

BACKGROUND

Exemplary embodiments pertain to the art of gas turbine engines and, more particularly, to a serpentine turn cover for gas turbine engines.

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads. Both the compressor and turbine sections may include alternating arrays of rotating blades and stationary vanes that extend into the core airflow path of the gas turbine engine. For example, in the turbine section, turbine blades rotate and extract energy from the hot combustion gases that are communicated along the core airflow path. The turbine vanes guide the airflow and prepare it for the downstream set of blades.

Turbine vanes are known to include internal passageways configured to direct a flow of cooling fluid within the interior of the vane. The flow of cooling fluid protects the vane from the relatively hot fluid in the core airflow path. In order to reduce the amount of cooling flow needed to meet temperature requirements, the same cooling flow may be used to cool the platform of the vane and part of the airfoil itself. After cooling the platform, the cooling air must make its way to the inlet of the airfoil serpentine cooling passages. Inside the airfoil serpentine, the air will turn from the inner diameter to the outer diameter and make a final turn before dispersing into airfoil trailing edge discharge features.

Serpentine passageways are formed within an interior of an airfoil section of the vane, and are often formed integrally with the remainder of the vane using an investment casting process, for example. However, cast-in serpentine turning features at the outer diameter of the airfoil are subject to high metal temperatures and the stress at the air inlet corners may be unacceptably high.

BRIEF DESCRIPTION

Disclosed is a stator vane assembly including an inner diameter platform. The assembly also includes an outer diameter platform defining an air inlet orifice extending radially therethrough. Further included is an airfoil extending between the inner diameter platform and the outer diameter platform, the airfoil having a hollow portion therein defining a serpentine cooling airflow path fluidly coupled to the air inlet orifice. Yet further included is a collar extending radially outwardly from the outer diameter platform and positioned adjacent the air inlet orifice, the collar extending to a non-uniform radial distance. The assembly also includes a turn cover operatively coupled to the collar.

In addition to one or more of the features described above, or as an alternative, further embodiments may include that the turn cover is welded to the collar.

In addition to one or more of the features described above, or as an alternative, further embodiments may include that the turn cover is formed of sheet metal.

In addition to one or more of the features described above, or as an alternative, further embodiments may include that the airfoil, the outer diameter platform and the collar are integrally formed.

In addition to one or more of the features described above, or as an alternative, further embodiments may include that the airfoil, the outer diameter platform and the collar are formed from a casting process.

In addition to one or more of the features described above, or as an alternative, further embodiments may include that a radially outer surface of the collar is angled to include a most radially inward location.

In addition to one or more of the features described above, or as an alternative, further embodiments may include that the most radially inward location is located adjacent to the air inlet orifice.

In addition to one or more of the features described above, or as an alternative, further embodiments may include that the radially outer surface of the collar is a continuous planar surface.

In addition to one or more of the features described above, or as an alternative, further embodiments may include that the radially outer surface of the collar is contoured.

In addition to one or more of the features described above, or as an alternative, further embodiments may include that the radially outer surface of the collar is contoured to include at least one portion that is concave.

In addition to one or more of the features described above, or as an alternative, further embodiments may include that the radially outer surface of the collar is contoured to include at least one portion that is convex.

Also disclosed is a gas turbine engine including a compressor section, a combustor section, and a turbine section. Also included is a stator vane assembly located within the turbine section. The stator vane assembly includes an outer diameter platform defining an air inlet orifice extending radially therethrough. The stator vane assembly also includes an airfoil extending between the inner diameter platform and the outer diameter platform, the airfoil having a hollow portion therein defining a serpentine cooling airflow path fluidly coupled to the air inlet orifice. The stator vane assembly further includes a turn cover welded to the outer diameter platform adjacent to the air inlet orifice.

In addition to one or more of the features described above, or as an alternative, further embodiments may include a collar extending radially outwardly from the outer diameter platform, the turn cover welded to a radially outer surface of the collar.

In addition to one or more of the features described above, or as an alternative, further embodiments may include that the collar extends to a non-uniform radial distance.

In addition to one or more of the features described above, or as an alternative, further embodiments may include that the collar extends to a uniform radial distance.

In addition to one or more of the features described above, or as an alternative, further embodiments may include that the airfoil, the outer diameter platform and the collar are integrally formed.

In addition to one or more of the features described above, or as an alternative, further embodiments may include that the radially outer surface of the collar is angled to include a most radially inward location.

In addition to one or more of the features described above, or as an alternative, further embodiments may include that the radially outer surface of the collar is flat.

In addition to one or more of the features described above, or as an alternative, further embodiments may include that the radially outer surface of the collar is contoured.

Further disclosed is a method of assembling a stator vane assembly for a gas turbine engine. The method includes integrally forming a stator vane and an outer diameter platform, the stator vane having a hollow portion therein defining a serpentine cooling airflow path fluidly coupled to an air inlet orifice of the outer diameter platform. The method also includes welding a turn cover to the outer diameter platform adjacent to the air inlet orifice.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
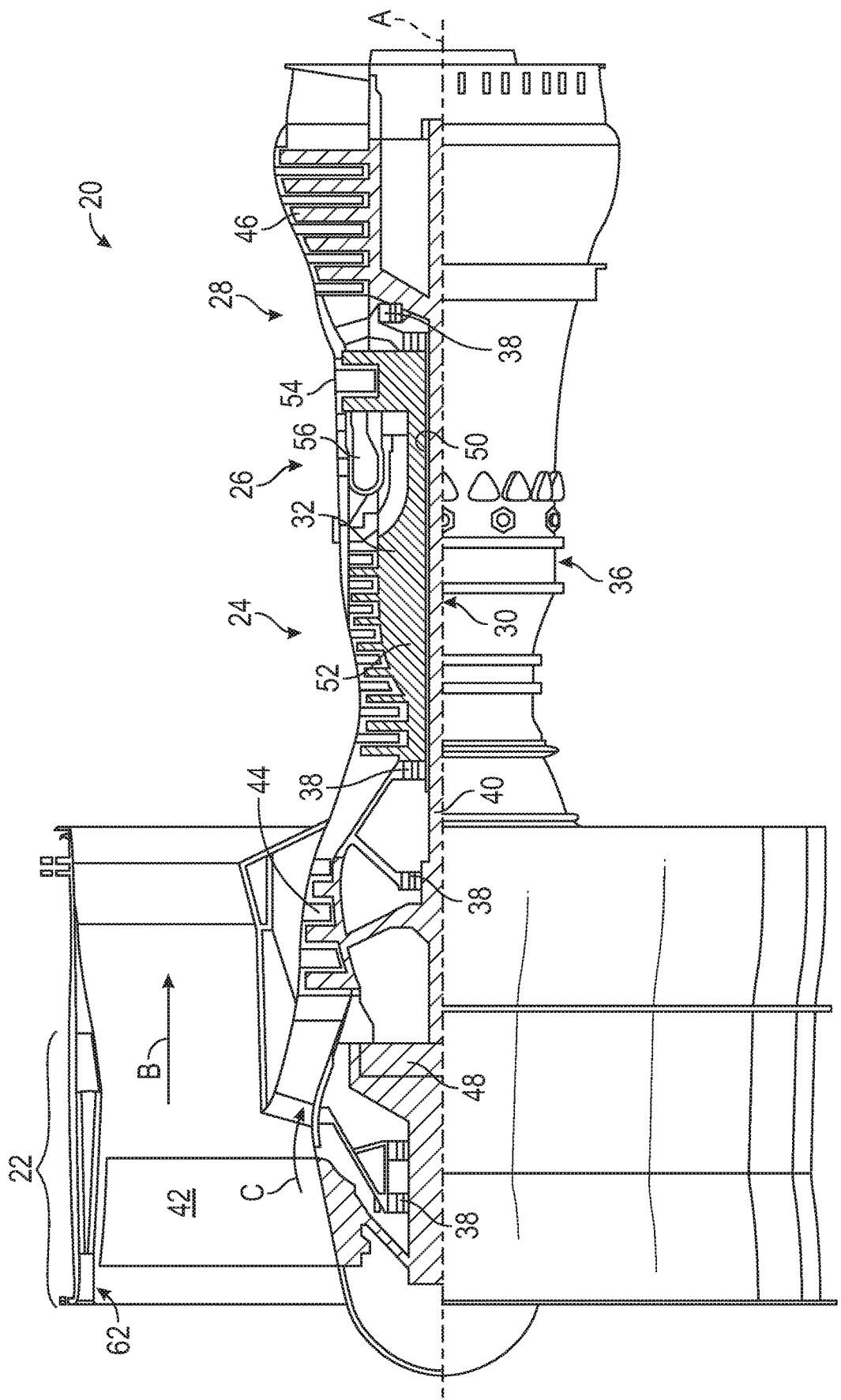
FIG. 1 is a side, partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25 (FIG. 2), while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Various components of the gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation.

Figure 2:
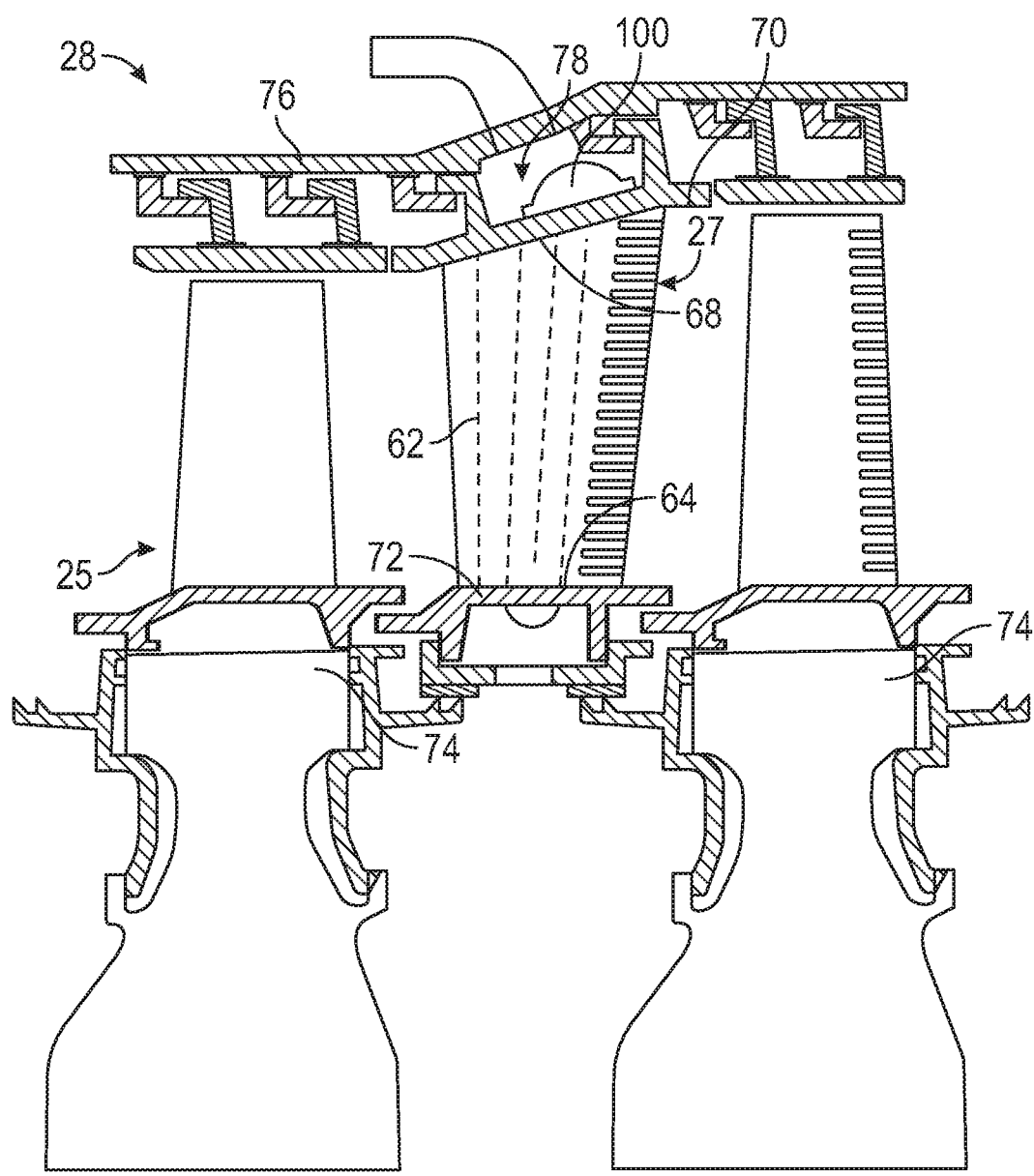
FIG. 2 is a schematic illustration of a portion of the gas turbine engine showing rotor assemblies and a stator vane assembly.

FIG. 2 is a partial schematic view of the turbine section 28. As described above, the turbine section 28 includes airfoils in the form of stationary stator vane assemblies 27 and other airfoils that are blades 25 of turbines disks. The illustrated stator vane assembly 27 is an airfoil with one or more internal cavities 60 (FIG. 6) defining a number of cooling passages. The airfoil cavities 60 are formed within the airfoil and are at least partially defined by partitions 62 that extend either from an inner diameter 64 or an outer diameter 68 of the vane 27. The partitions 62, as shown, extend for a portion of the internal radial distance of the vane 27 to form a serpentine passage within the vane 27. As such, the partitions 62 may stop or end prior to forming a complete wall within the vane 27. Thus, each of the airfoil cavities 60 may be fluidly connected.

The vane 27 includes an outer diameter platform 70 and an inner diameter platform 72. The vane platforms 70, 72 are configured to enable attachment within and to the gas turbine engine 20. For example, as appreciated by those of skill in the art, the inner diameter platform 72 can be mounted between adjacent rotor disks 74 and the outer diameter platform 70 can be mounted to a case 76 of the gas turbine engine 20. As shown, an outer diameter cavity 78 is formed between the case 76 and the outer diameter platform 70. The outer diameter cavity 78 is outside of, or separate from, the core flow path C. The body of the vane 27 extends from and between surfaces of the respective platforms 70, 72. In some embodiments, the platforms 70, 72 and the body of the vane 27 are a unitary body.

Figure 6:
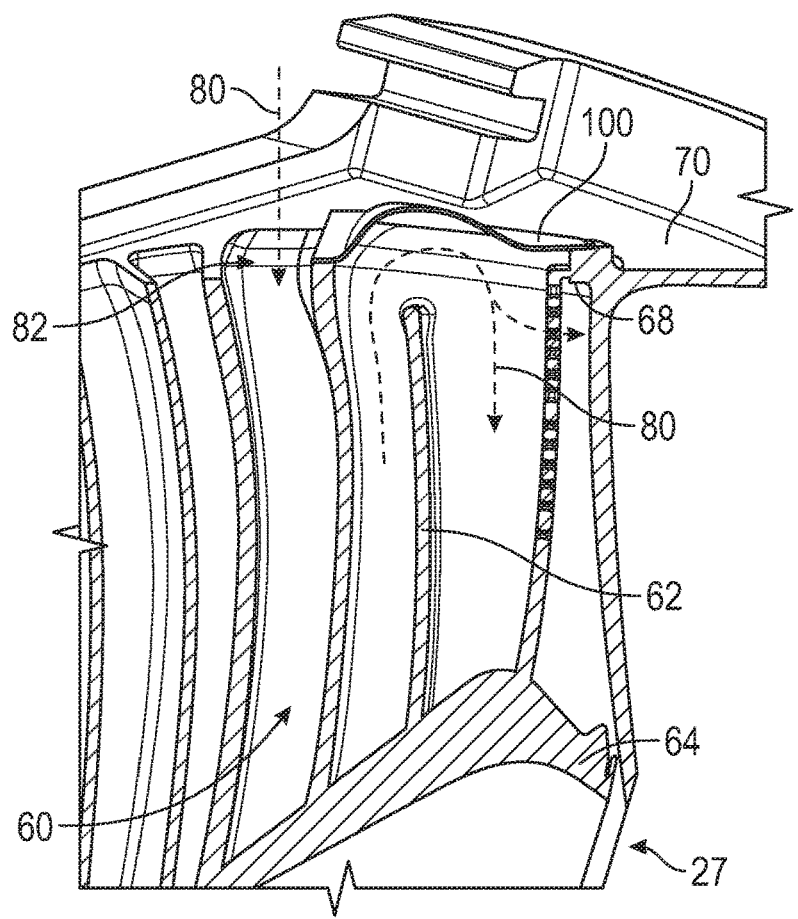
FIG. 6 is a cross-sectional view of a turn cover taken along line B-B of FIG. 3.

Air is passed through the airfoil cooling cavities 60 of the vane 27 to provide cooling airflow to prevent overheating of the airfoils and/or other components or parts of the gas turbine engine 20. The airfoil cavities 60 are configured to have air flow therethrough to cool the vane 27. For example, as shown in FIG. 6, an airflow path 80 is indicated by a dashed line. In the configuration of FIG. 6, air flows from the outer diameter cavity 78 and into the airfoil cooling cavities 60 through an inlet feed orifice 82 defined by the outer diameter platform 70. The air then flows into and through the airfoil cooling cavities 60 as indicated by the airflow path 80. A turn cover 100 is operatively coupled (welding or brazing, for example) to the outer diameter platform 70 to facilitate turning of the airflow 80, as described in detail herein.

Figure 3:
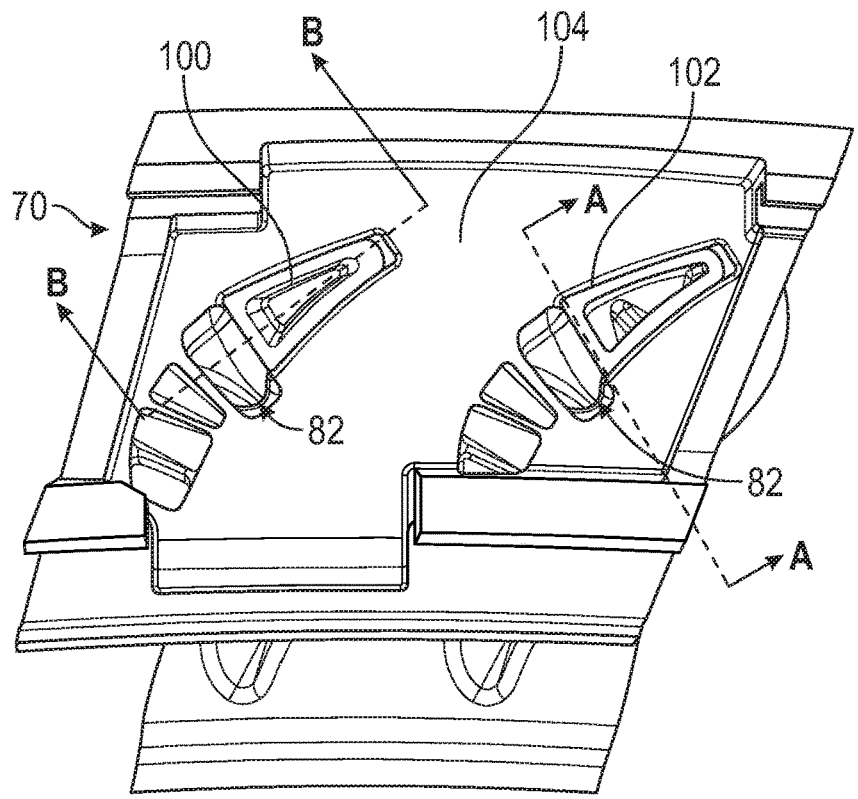
FIG. 3 is a perspective view of an outer diameter of a stator platform of the stator vane assembly.

Referring now to FIG. 3, a segment of the outer diameter platform 70 is viewed from a radially outward to inward perspective. The illustrated segment of the outer diameter platform 70 includes two adjacent stator vane locations, one of which is illustrated with the turn cover 100 operatively coupled thereto and the other having the turn cover 100 removed to illustrate a platform collar 102 that is integrally formed with the outer diameter platform 70 in a casting process. The turn cover 100 is affixed to the platform collar 102 using various manufacturing weld, and/or braze processes in some embodiments, but alternative joining methods are contemplated. However, the turn cover 100 is not integrally formed with the outer diameter platform 70, such as with a casting process, to avoid thick and stiff walls that create stress risers that are inherently present with the geometries of the relevant components.

The platform collar 102, and the turn cover 100 that is operatively coupled thereto, is positioned adjacent to the inlet feed orifice 82 of the outer diameter platform 70, thereby allowing the cooling airflow 80 to enter the vane 27.

Figure 4:
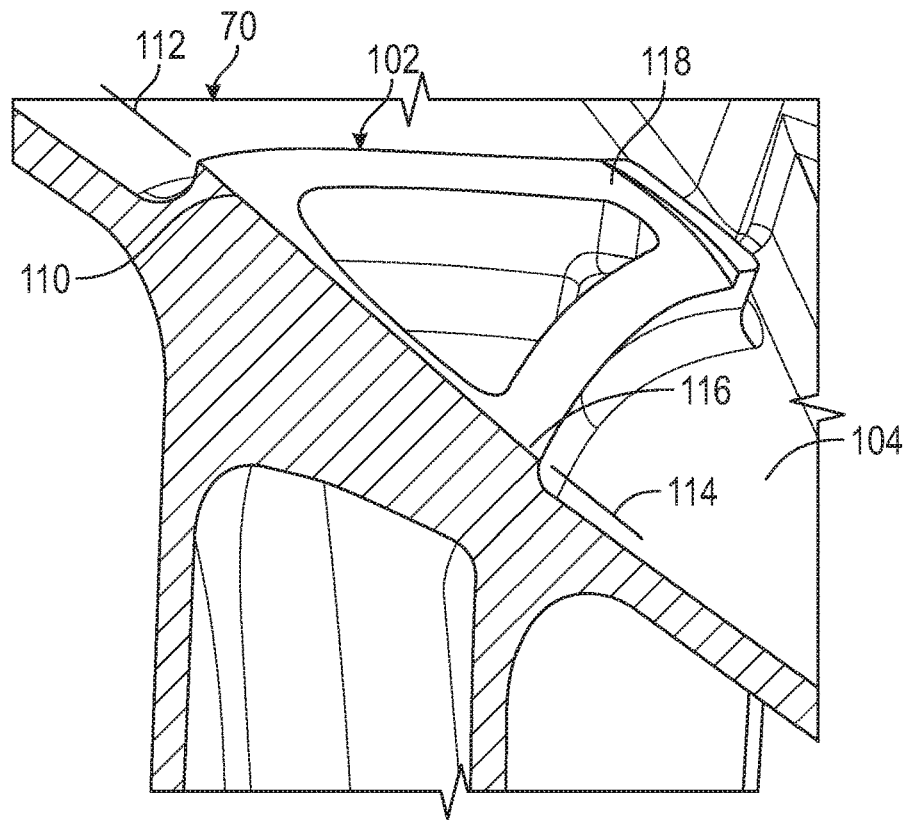
FIG. 4 is a cross-sectional view of a platform collar taken along line A-A of FIG. 3.
Figure 5:
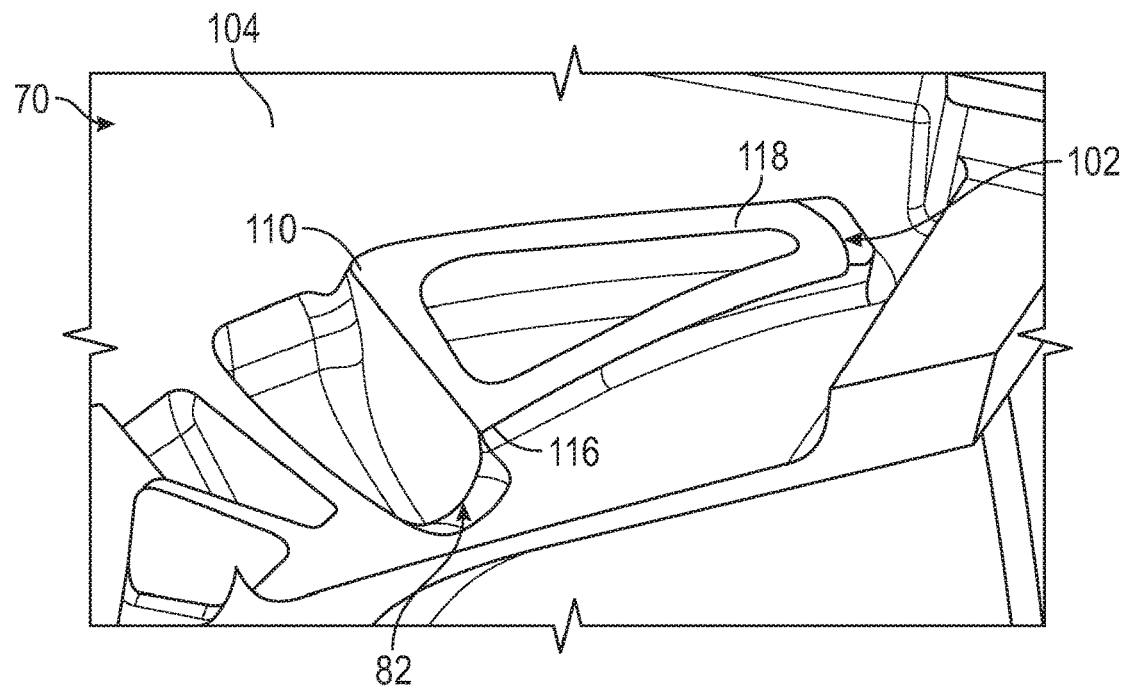
FIG. 5 is a perspective view of the platform collar.

Referring to FIGS. 4 and 5, the platform collar 102 is illustrated in greater detail. The platform collar 102 is a feature of the outer diameter platform 70 that extends radially outwardly from a main surface 104 of the outer diameter platform 70. The platform collar 102 does not have to extend to a common radial height, or to a uniform arcuate profile. Rather, the platform collar 102 is an angled collar that extends to different radially outward distances (i.e., non-uniform radial height). In particular, at least a portion of the platform collar 102 tilts at an angle to provide a lower height near the inlet feed orifice 82 of the platform collar 102. As shown, the corner of the platform collar 102 referenced with numeral 110 has a height 112 that is greater than a height 114 of the corner 116. The heights 112, 114 are measured from the main surface 104 of the outer diameter platform 70 to the radial position of the platform collar 102.

The radially outer surface 118 of the platform collar 102 is the surface to which the turn cover 100 is welded and/or brazed to. The height of the platform collar 102 is high enough to have sufficient depth for welding the turn cover 100 to it. The radially outer surface 118 is flat (i.e., continuous planar surface) in some embodiments, but may be contoured in other embodiments to reduce stress. In an embodiment with a contoured radially outer surface that does not include a continuous planar surface, the radially outers surface 118 may be tailored to have either convex and/or concave curvature depending on local thermal strain requirements necessary to mitigate thermal mechanical fatigue (TMF) and/or low cycle fatigue (LCF) crack initiation and propagation.

Figure 7:
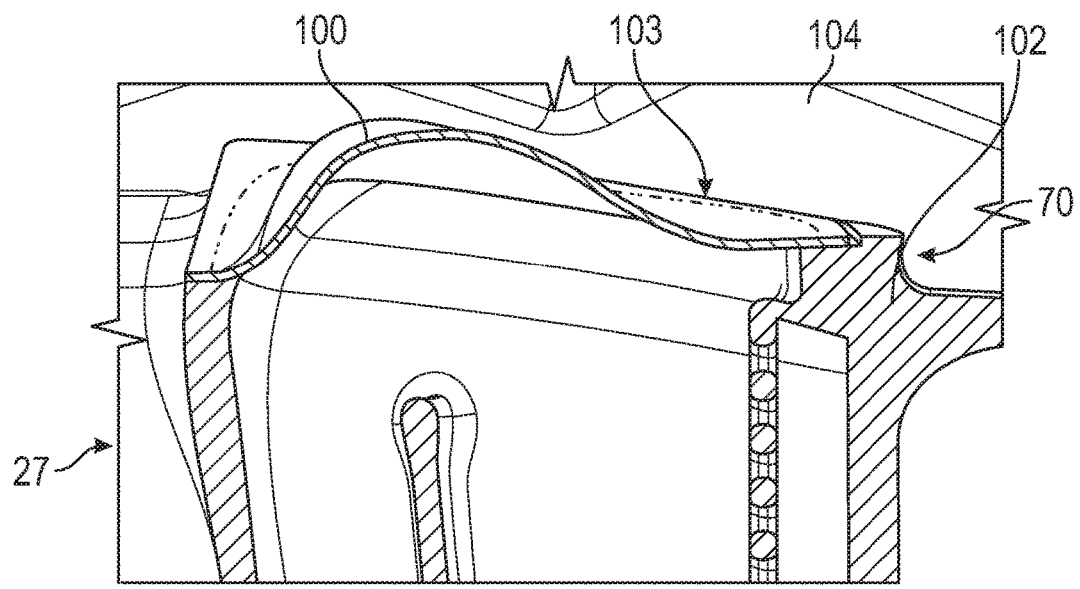
FIG. 7 is an enlarged view of the sectional view of FIG. 6 of the turn cover.
Figure 8:
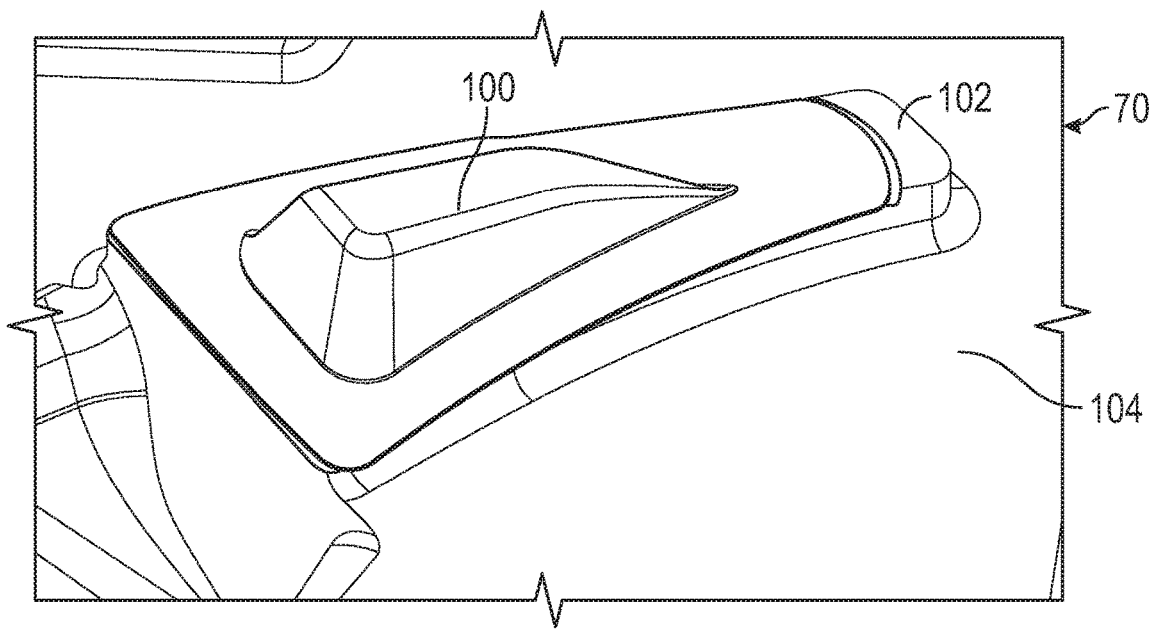
FIG. 8 is a perspective view of the turn cover.

Referring to FIGS. 6-8, the turn cover 100 is illustrated in an installed condition. In particular, the turn cover 100 which is a component separately formed from the remainder of the vane assembly 27, including the outer diameter platform 102, is operatively coupled to the platform collar 102 in the manner described herein. The turn cover 100 is sheet metal in some embodiments and is contoured to create the serpentine turn on the top of the platform collar 102.

Although the turn cover may be fabricated using standard forming tooling for sheet metal design and material applications, other manufacturing processes may be desirable and enable further design optimization to minimize internal flow separation resulting in undesirable pressure losses and poor internal convective heat transfer characteristics. Alternative turn cover design geometries may be fabricated using advanced additive manufacturing methods, such as a metal based powder laser sintering process, more commonly referred to as Direct Metal Laser Sintering (DMLS), or Select Laser Sintering (SLS). Additive manufacturing processes enable the turn cover design concepts to be more elaborate and specifically tailored by enabling the incorporation of geometric flow features and surface contours that may be unachievable using conventional sheet metal forming and joining processes.

With traditional cast-in serpentine turns and high metal temperatures on the vane 27, the stress at the air inlet corner(s) of orifice 82 is much higher when compared to the embodiments described herein. Removing the cast-in turn results in a collar-cover configuration serves as a conduit that turns and redirects the internal cooling air flow to downstream cooling passages in order maximize the convective and thermal efficiency of overall cooling configuration. The angled platform collar 102 described herein, with its lowered height near the orifice 82 corner, yields a significantly lower stress at that region by reducing and minimizing the local "stiffness" and thermal strain between the relatively colder platform collar 102 walls and the hotter surrounding platform main surface 104 of the outer diameter platform 70. In an alternative embodiment the offset distance and radial height of the platform collar 102 may vary non-uniformly, creating a nonplanar radial outward surface 118 in order to optimally tailor and minimize the local thermal-mechanical strain distribution that exists between the colder platform collar 102 and the hotter surrounding platform main surface 104 and inlet corner(s) of orifice 82. The radial outward surface 118 may also comprise of convex and/or convex surface curvatures used in conjunction with planar surfaces in order to mitigate locally high thermal-mechanical strains that may result in thermal mechanical fatigue (TMF) and/or low cycle fatigue (LCF) crack initiation and propagation.

The higher corner(s) of the platform collar 102 provide sufficient depth for welding operations, represented by dash line 103 in FIG. 7. In addition to the stress reduction, the thick wall of a cast-in turn feature is replaced with the thin sheet metal turn cover 100, thereby reducing weight of the overall system.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A stator vane assembly comprising:
an inner diameter platform;
an outer diameter platform defining an air inlet orifice extending radially therethrough;
an airfoil extending between the inner diameter platform and the outer diameter platform, the airfoil having a hollow portion therein defining a serpentine cooling airflow path fluidly coupled to the air inlet orifice;
a collar extending radially outwardly from the outer diameter platform and positioned adjacent the air inlet orifice, the collar extending to a non-uniform radial distance, wherein a radially outer surface of the collar is angled such that a height of the radially outer surface adjacent to the air inlet orifice is lower than a height of other portions of the radially outer surface; and
a turn cover operatively coupled to the collar.

2. The stator vane assembly of claim 1, wherein the turn cover is welded to the collar.

3. The stator vane assembly of claim 1, wherein the turn cover is formed of sheet metal.

4. The stator vane assembly of claim 1, wherein the airfoil, the outer diameter platform and the collar are integrally formed.

5. The stator vane assembly of claim 4, wherein the airfoil, the outer diameter platform and the collar are formed from a casting process.

6. The stator vane assembly of claim 1, wherein a height of a corner of the radially outer surface adjacent to the air inlet orifice is lower than a height of another corner of the radially outer surface.

7. The stator vane assembly of claim 6, wherein the corner is located adjacent to the air inlet orifice.

8. The stator vane assembly of claim 1, wherein the radially outer surface of the collar is a continuous planar surface.

9. The stator vane assembly of claim 1, wherein the radially outer surface of the collar is contoured.

10. The stator vane assembly of claim 9, wherein the radially outer surface of the collar is contoured to include at least one portion that is concave.

11. The stator vane assembly of claim 9, wherein the radially outer surface of the collar is contoured to include at least one portion that is convex.

12. A gas turbine engine comprising:
a compressor section;
a combustor section;
a turbine section; and
a stator vane assembly located within the turbine section, the stator vane assembly comprising:
an outer diameter platform defining an air inlet orifice extending radially therethrough;

an airfoil extending between an inner diameter platform and the outer diameter platform, the airfoil having a hollow portion therein defining a serpentine cooling airflow path fluidly coupled to the air inlet orifice;

a collar extending radially outwardly from the outer diameter platform and positioned adjacent the air inlet orifice, the collar extending to a non-uniform radial distance, wherein a radially outer surface of the collar is angled such that a height of the radially outer surface adjacent to the air inlet orifice is lower than a height of other portions of the radially outer surface; and a turn cover welded to the outer diameter platform adjacent to the air inlet orifice.

13. The gas turbine engine of claim 12, wherein a height of a corner of the radially outer surface adjacent to the air inlet orifice is lower than a height of another corner of the radially outer surface.

14. The gas turbine engine of claim 13, wherein the collar extends to a non-uniform radial distance.

15. The gas turbine engine of claim 13, wherein the collar extends to a uniform radial distance.

16. The gas turbine engine of claim 13, wherein the airfoil, the outer diameter platform and the collar are integrally formed.

17. The gas turbine engine of claim 13, wherein the corner is located adjacent to the air inlet orifice.

18. The gas turbine engine of claim 13, wherein the radially outer surface of the collar is flat.

19. The gas turbine engine of claim 13, wherein the radially outer surface of the collar is contoured.

20. A method of assembling a stator vane assembly for a gas turbine engine, the method comprising:

integrally forming a stator vane, with an inner diameter platform, an outer diameter platform and an airfoil extending between the inner diameter platform and the outer diameter platform, the airfoil, having a hollow portion therein defining a serpentine cooling airflow path fluidly coupled to an air inlet orifice of the outer diameter platform, the outer diameter platform having a collar extending radially outwardly from the outer diameter platform and positioned adjacent the air inlet orifice, the collar extending to a non-uniform radial distance, wherein a radially outer surface of the collar is angled such that a height of the radially outer surface adjacent to the air inlet orifice is lower than a height of other portions of the radially outer surface; and welding a turn cover to the outer diameter platform adjacent to the air inlet orifice.

* * * * *